(12) United States Patent
Davydov et al.

(10) Patent No.: US 9,525,446 B2
(45) Date of Patent: Dec. 20, 2016

(54) INTERFERENCE AVERAGING AND INTERFERENCE RESOURCE GROUPS IN A WIRELESS COMMUNICATION SYSTEM

(71) Applicant: INTEL CORPORATION, Santa Clara, CA (US)

(72) Inventors: Alexei Davydov, Nizhny Novgorod (RU); Gregory Morozov, Nizhny Novgorod (RU); Kamran Etemad, Potomac, MD (US); Vadim Sergeyev, Nizhny Novgorod (RU); Ilya Bolotin, Nizhny Novgorod (RU); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 14/127,900

(22) PCT Filed: Sep. 6, 2013

(86) PCT No.: PCT/US2013/058556
§ 371 (c)(1),
(2) Date: Dec. 19, 2013

(87) PCT Pub. No.: WO2014/088662
PCT Pub. Date: Jun. 12, 2014

(65) Prior Publication Data
US 2015/0264594 A1    Sep. 17, 2015

Related U.S. Application Data

(60) Provisional application No. 61/732,851, filed on Dec. 3, 2012.

(51) Int. Cl.
*H04W 40/16*    (2009.01)
*H04B 1/12*    (2006.01)
(Continued)

(52) U.S. Cl.
CPC .............. *H04B 1/12* (2013.01); *H04B 1/3827* (2013.01); *H04B 7/0452* (2013.01);
(Continued)

(58) Field of Classification Search
None
See application file for complete search history.

(56) References Cited

U.S. PATENT DOCUMENTS

2010/0165971 A1    7/2010 Kim et al.
2011/0070919 A1    3/2011 Komine et al.
(Continued)

FOREIGN PATENT DOCUMENTS

EP            2701423 A1    2/2014
WO    2008104643 A1    9/2008
(Continued)

OTHER PUBLICATIONS

International Search Report and Written Opinion for PCT Application No. PCT/US2013/058556, dated Dec. 27, 2013, 13 pages.
(Continued)

*Primary Examiner* — Omar Ghowrwal
*Assistant Examiner* — Angel Brockman
(74) *Attorney, Agent, or Firm* — Schwabe, Williamson & Wyatt, P.C.

(57) ABSTRACT

Methods, apparatuses, and systems are described related to interference averaging to generate feedback information and interference averaging to demodulate receives signals. In embodiments, an evolved Node B (eNB) may transmit interference averaging information to a user equipment (UE) including a time domain averaging indicator indicating a time domain averaging window to be used by the UE for averaging interference measurements in a time domain or a frequency domain averaging indicator to indicate a frequency domain averaging window to be used by the UE for
(Continued)

averaging interference measurements in a frequency domain. Additionally, or alternatively, the eNB may transmit an interference resource group (IRG) indicator to the UE to indicate an IRG over which the UE is to perform interference averaging to facilitate demodulation of signals received by the UE from the eNB.

25 Claims, 6 Drawing Sheets

(51) Int. Cl.
| | |
|---|---|
| H04W 72/12 | (2009.01) |
| H04B 1/3827 | (2015.01) |
| H04W 84/18 | (2009.01) |
| H04W 92/18 | (2009.01) |
| H04W 72/04 | (2009.01) |
| H04L 5/00 | (2006.01) |
| H04W 36/10 | (2009.01) |
| H04W 52/40 | (2009.01) |
| H04W 76/04 | (2009.01) |
| H04J 11/00 | (2006.01) |
| H04W 72/08 | (2009.01) |
| H04W 76/02 | (2009.01) |
| H04W 52/02 | (2009.01) |
| H04L 1/00 | (2006.01) |
| H04W 24/02 | (2009.01) |
| H04L 25/02 | (2006.01) |
| H04B 7/04 | (2006.01) |
| H04B 7/06 | (2006.01) |
| H04B 7/155 | (2006.01) |
| H04L 1/18 | (2006.01) |
| H04W 84/04 | (2009.01) |

(52) U.S. Cl.
CPC ....... *H04B 7/0617* (2013.01); *H04B 7/15557* (2013.01); *H04J 11/005* (2013.01); *H04J 11/0053* (2013.01); *H04L 1/0003* (2013.01); *H04L 1/0054* (2013.01); *H04L 1/1854* (2013.01); *H04L 1/1867* (2013.01); *H04L 5/0007* (2013.01); *H04L 5/0048* (2013.01); *H04L 5/0053* (2013.01); *H04L 5/0055* (2013.01); *H04L 5/0057* (2013.01); *H04L 5/0058* (2013.01); *H04L 25/0202* (2013.01); *H04W 24/02* (2013.01); *H04W 36/10* (2013.01); *H04W 52/0261* (2013.01); *H04W 52/40* (2013.01); *H04W 72/042* (2013.01); *H04W 72/0406* (2013.01); *H04W 72/048* (2013.01); *H04W 72/0486* (2013.01); *H04W 72/08* (2013.01); *H04W 72/082* (2013.01); *H04W 72/12* (2013.01); *H04W 72/121* (2013.01); *H04W 72/1242* (2013.01); *H04W 72/1247* (2013.01); *H04W 76/023* (2013.01); *H04W 76/046* (2013.01); *H04W 76/048* (2013.01); *H04W 84/18* (2013.01); *H04W 92/18* (2013.01); *H04W 72/1205* (2013.01); *H04W 84/042* (2013.01); *Y02B 60/50* (2013.01)

(56) References Cited

U.S. PATENT DOCUMENTS

| | | | |
|---|---|---|---|
| 2012/0275322 | A1 | 11/2012 | Ji et al. |
| 2013/0155974 | A1* | 6/2013 | Papasakellariou et al. .. 370/329 |
| 2013/0295949 | A1 | 11/2013 | Seo et al. |
| 2013/0301450 | A1* | 11/2013 | Geirhofer et al. ............ 370/252 |

FOREIGN PATENT DOCUMENTS

| | | |
|---|---|---|
| WO | 2012105766 A2 | 8/2012 |
| WO | 2012142901 A1 | 10/2012 |

OTHER PUBLICATIONS

Discussion on interference measurement for CSI feedback, 3GPP TSG-RAN WG1, Meeting #66bis, Agenda Item 7.5.2, Zhuhai, China, Oct. 10-14, 2011.
Discussion and Evaluation on interference measurement, 3GPP TSG-RAN WG1 Meeting #67, Agenda Item 7.5.2.2, San Francisco, USA, Nov. 14-18, 2011.
International Preliminary Report on Patentability mailed Jun. 18, 2015 from International Application No. PCT/US2013/058556.
Extended European Search Report issued Sep. 26, 2016 from European Patent Application No. 13860934.2, 11 pages.

* cited by examiner

INTERFERENCE AVERAGING AND INTERFERENCE RESOURCE GROUPS IN A WIRELESS COMMUNICATION SYSTEM

CROSS REFERENCE TO RELATED APPLICATIONS

The present application is a national phase entry under 35 U.S.C. §371 of International Application No. PCT/US2013/058556, filed Sep. 6, 2013, entitled "INTERFERENCE AVERAGING AND INTERFERENCE RESOURCE GROUPS IN A WIRELESS COMMUNICATION SYSTEM", which designates the United States of America, and which claims priority to U.S. Provisional Patent Application No. 61/732,851, filed Dec. 3, 2012, entitled "Advanced Wireless Communication Systems and Techniques," the entire disclosure of which is hereby incorporated by reference in its entirety.

CROSS REFERENCE TO RELATED APPLICATIONS

The present application claims priority to U.S. Provisional Patent Application No. 61/732,851 filed 3 Dec. 2012 and entitled "Advanced Wireless Communication Systems and Techniques," the entire disclosure of which is hereby incorporated by reference in its entirety.

FIELD

Embodiments of the present invention relate generally to wireless networks and more particularly to interference averaging and interference resource groups in wireless networks.

BACKGROUND

In some wireless communication networks, such as Long Term Evolution Advanced (LTE-A) networks, a user equipment measures interference on a channel of the network to generate channel state information (CSI) feedback. The UE sends the CSI feedback to an evolved Node B (eNB). However, the UE is not restricted to a time or frequency interval over which to average interference for generation of CSI.

Additionally, many UEs have interference-aware receivers that take interference measurements into account when decoding signals received from the eNB. The UE uses separate interference measurements for each physical resource block (PRB) of the channel, and is prohibited from averaging the interference measurements over a plurality of PRBs.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, computer-readable media, and apparatuses for interference averaging and using interference resource groups in a wireless communication system.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrase "A and/or B" means (A), (B), or (A and B). The phrases "NB" and "A or B" mean (A), (B), or (A and B), similar to the phrase "A and/or B."

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality.

Figure 1:
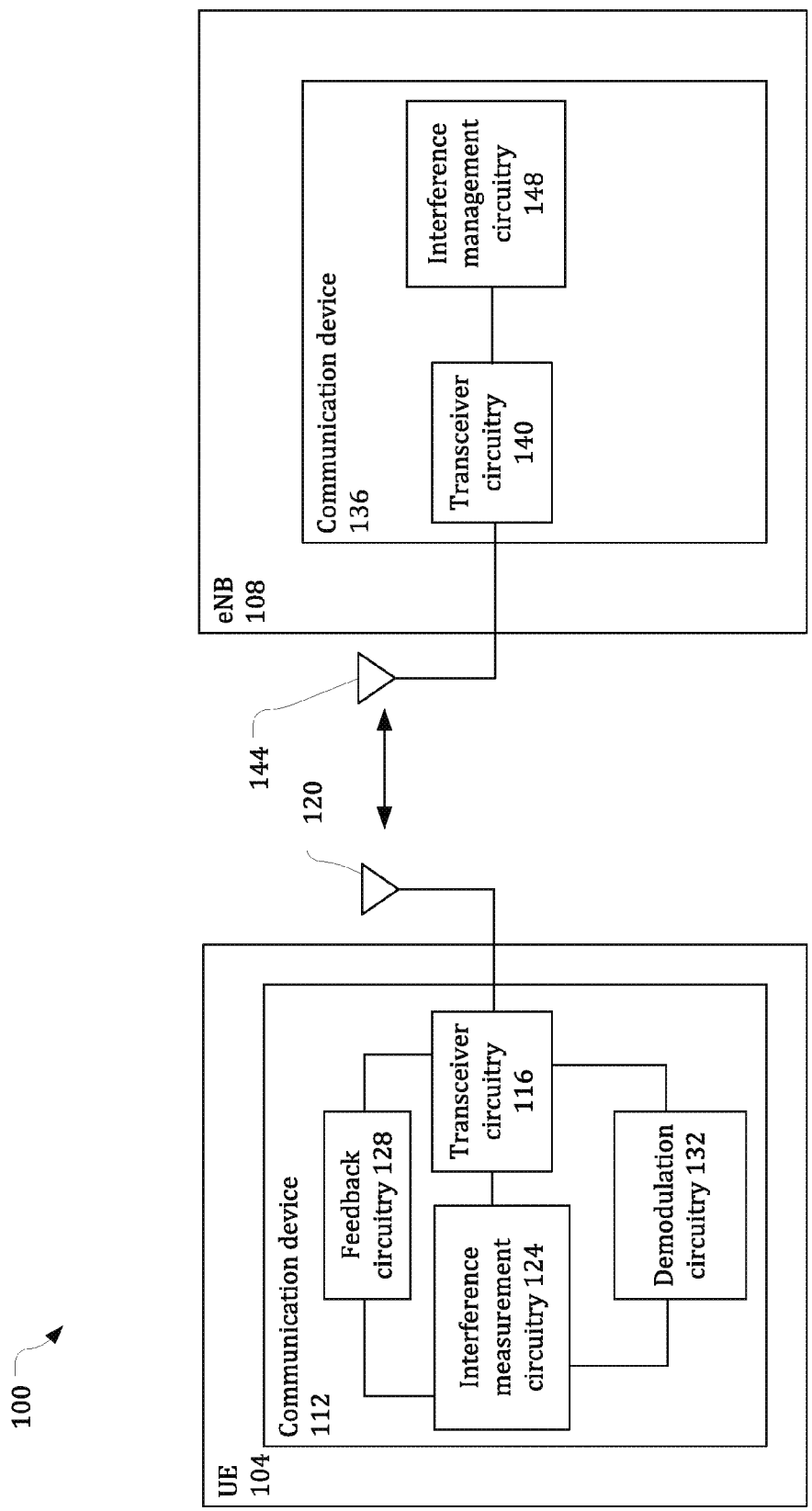
FIG. 1 schematically illustrates a high-level example of a network system comprising a user equipment (UE) and an evolved Node B (eNB), in accordance with various embodiments.

FIG. 1 schematically illustrates a network environment 100 in accordance with various embodiments. The network environment 100 includes a user equipment (UE) 104 wirelessly coupled with an evolved Node B (eNB) 108 of a radio access network (RAN) via an over-the-air (OTA) interface. The RAN may be part of a 3GPP LTE Advanced (LTE-A) network and may be referred to as an evolved universal terrestrial radio access network (EUTRAN). In other embodiments, other radio access network technologies may be utilized.

The UE 104 may include a communication device 112 that implements various communication protocols in order to effectuate communication with the eNB 108. The communication device 112 may be a chip, chipset, or other collection of programmed and/or preconfigured circuitry. In some embodiments, the communication device 112 may include or be part of baseband circuitry, radio-frequency circuitry, etc.

The communication device 112 may include transceiver circuitry 116 to wirelessly communicate with the eNB 108 over a channel of a wireless communication network (e.g., the RAN). The transceiver circuitry 116 may be coupled with one or more antennas 120 of the UE 104 to transmit wireless signals to, and/or receive wireless signals from, the eNB 108.

The communication device 112 may further include interference measurement circuitry 124, feedback circuitry 128, and demodulation circuitry 132 coupled to the transceiver circuitry 116. The interference measurement circuitry 124 may be used to measure interference and/or noise on the channel over which the UE 104 communicates with the eNB 108. The feedback circuitry 128 may use one or more of the interference measurements to generate feedback information, such as channel state information (CSI), associated with the channel. Additionally, or alternatively, the demodulation circuitry 132 may use one or more of the interference measurements to demodulate signals received by the UE 104 from the eNB 108.

In some embodiments, the interference measurements used to generate the feedback information may be different from the interference measurements used to demodulate signals received from the eNB 108. For example, the interference measurements used to generate feedback information may be performed on CSI-interference measurement resource elements (CSI-IM REs) of the channel. The interference measurements used to demodulate signals received from the eNB 108 may be measured on cell-specific reference signals (CRSs) or UE-specific reference signals transmitted by the eNB 108.

It will be appreciated that the connections between the circuitry of the communication device 112 shown in FIG. 1 are presented as an example, and some embodiments may include fewer, additional, and/or different connections between the circuitry of communication device 112.

The eNB 108 may include a communication device 136 that implements various communication protocols in order to effectuate communication with the UE 104. The communication device 136 may be a chip, chipset, or other collection of programmed and/or preconfigured circuitry. In some embodiments, the communication device 136 may include or be part of baseband circuitry, radio-frequency circuitry, etc.

The communication device 136 may include transceiver circuitry 140 to wirelessly communicate with the UE 104. The transceiver circuitry 140 may be coupled with one or more antennas 144 of the eNB 108 to transmit wireless signals to, and/or receive wireless signals from, the UE 104. The communication device 136 may further include interference management circuitry 148 coupled to the transceiver circuitry 140.

In various embodiments, the transceiver circuitry 116 may receive, from the eNB 108, interference averaging information to be used by the UE 104 for generating feedback information (e.g., CSI) associated with the channel over which the UE 104 communicates with the eNB 108. The interference averaging information may be transmitted by the interference management circuitry 148 of the eNB 108, via the transceiver circuitry 140.

The interference averaging information may include a time-domain averaging indicator to indicate a time domain averaging window to be used by the UE 104 for averaging interference measurements in the time domain. In some embodiments, the interference averaging information may additionally or alternatively include a frequency domain averaging indicator to indicate a frequency domain averaging window to be used by the UE 104 for averaging interference measurements in the frequency domain. The frequency domain averaging window may correspond to a number of frequency sub-bands of the channel over which the UE 104 is to perform interference averaging in the frequency domain. In some embodiments, the eNB 108 may transmit the time domain averaging indicator and/or frequency domain averaging indicator to the UE 104 via radio resource control (RRC) signaling.

In various embodiments, the interference measurement circuitry 124 may obtain a plurality of interference measurements associated with the channel. For example, the interference measurements may include channel quality indicators (CQIs). In some embodiments, the interference measurement circuitry 124 may measure the interference on one or more of the CSI-IM REs of the channel. The interference measurements may be separated in the time and/or frequency domains. The interference measurement circuitry 124 may average the interference measurements based on the interference averaging information to obtain an average interference for generating feedback information. For example, the interference measurement circuitry 124 may average the interference measurements in the time domain based on the time domain averaging indicator and/or average the interference measurements in the frequency domain based on the frequency domain averaging indicator. If the interference measurements include CQI, the interference measurement circuitry 124 may average the CQI measurements to obtain an average CQI.

In various embodiments, the feedback circuitry 128 may generate feedback information (e.g., CSI) associated with the channel based on the average interference obtained by the interference measurement circuitry 124. For example, the feedback information may include the average CQI obtained by the interference measurement circuitry 124. The transceiver circuitry 116 may transmit the feedback information to the eNB 108. The eNB 108 (e.g., the interference management circuitry 148) may use the feedback information to facilitate communications with the UE 104. For example, the eNB 108 may make scheduling decisions for the UE 104 based on the feedback information.

Accordingly, the eNB 108 may use the interference averaging information to control the parameters for interference averaging performed by the UE 104 for generating feedback information. The eNB 108 may select the time domain averaging window and/or the frequency domain averaging window based on traffic conditions on the channel and/or other factors. For example, in bursty traffic conditions, interference stations may frequently turn their transmissions on or off, making interference measurements with larger averaging windows in time and frequency inaccurate. In these cases, the eNB 108 may choose to use a shorter time domain averaging window and/or frequency domain averaging window. Alternatively, in environments in which interference remains relatively constant, it may be desirable to use a longer time domain averaging window and/or frequency domain averaging window.

As discussed above, the interference measurement circuitry 124 may perform the interference measurements on CSI-IM REs of the channel. The CSI-IM REs may be designated for interference measurements for generation of CSI.

In some embodiments, the time-domain averaging indicator may indicate a relative weighting of interference measurements obtained on CSI-IM REs separated in the time domain to use for interference averaging. For example, the time-domain averaging indicator may include a parameter, a, that is a value from 0 to 1, and the average interference in the time domain, $\sigma_{in}^2(n)$, that the UE 104 is to use to generate feedback information may be given by Equation (1):

$$\sigma_{in}^2(n) = \alpha \sigma_{in}^2(n-1) + (1-\alpha)\overline{\sigma}_{in}^2 \qquad (1)$$

where $\sigma_{in}^2(n-1)$ is the previous value of average interference (prior to the most recently received CSI-IM RE), and $\overline{\sigma}_{in}^2$ is the interference measurement on the most recently received CSI-IM RE.

In other embodiments, the time domain averaging indicator may indicate the value of the time domain averaging window in another manner. For example, the time domain averaging indicator may indicate a number of recently received CSI-IM REs to use for interference averaging.

In some embodiments, the time domain averaging indicator may indicate that the UE 104 is to limit interference averaging to a restricted time domain averaging window or that interference averaging is unrestricted in time. For example, the time domain averaging indicator may be a single bit (e.g., transmitted via RRC) that has a first value to indicate that the UE 104 is to limit interference averaging to a single subframe or a second value to indicate that interference averaging is unrestricted in time.

As discussed above, the frequency domain averaging indicator may indicate a number of frequency sub-bands over which the UE 104 is to perform interference averaging for generating feedback information. In some embodiments, the frequency domain averaging indicator may be a single bit (e.g., transmitted via RRC) having a first value to indicate that the frequency domain averaging window includes a single sub-band (e.g., the UE 104 is to restrict interference averaging to single sub-bands and not average interference across a plurality of sub-bands) or a second value to indicate that the UE 104 is to perform interference averaging in the frequency domain across all sub-bands of the channel. If the interference averaging is restricted to single sub-bands, the UE 104 may generate feedback information for individual sub-bands of the channel. If the interference averaging is performed across all sub-bands of the channel, the UE 104 may generate feedback information for the channel based on the average interference across all the sub-bands of the channel.

In other embodiments, the frequency domain averaging indicator may include more than one bit to indicate one of a plurality of options for the number of sub-bands over which the UE 104 is to perform interference averaging. For example, the frequency domain averaging indicator may indicate a fraction of the total sub-bands of the channel over which the UE 104 is to perform interference averaging. Alternatively, or additionally, the frequency domain averaging indicator may indicate a number value of the number of sub-bands over which the UE 104 is to perform interference averaging.

Alternatively, or additionally, to the eNB 108 transmitting the frequency domain averaging indicator to the UE 104, the UE 104 may assume the number of sub-bands in the frequency domain averaging window based on a CSI feedback model associated with the channel. The UE 104 may receive the CSI feedback model from the eNB 108. For example, the eNB 108 may instruct the UE 104 to use one of a plurality of configured CSI feedback models. The CSI feedback model may indicate a type of feedback information that the UE 104 is to generate and send to the eNB 108.

In some embodiments, the UE 104 may restrict interference averaging to single sub-bands in the frequency domain based on a determination that the CSI feedback model supports sub-band CQIs. In this case, the UE 104 may generate feedback information for individual sub-bands of the channel. However, if the CSI feedback model does not support sub-band CQIs, the UE 104 may perform interference averaging in the frequency domain across all sub-bands of the channel. In some embodiments, the assumption of the frequency domain averaging window by the UE 104 based on the CSI feedback model may be overruled by a frequency domain averaging indicator received from the eNB 108.

Figure 2:
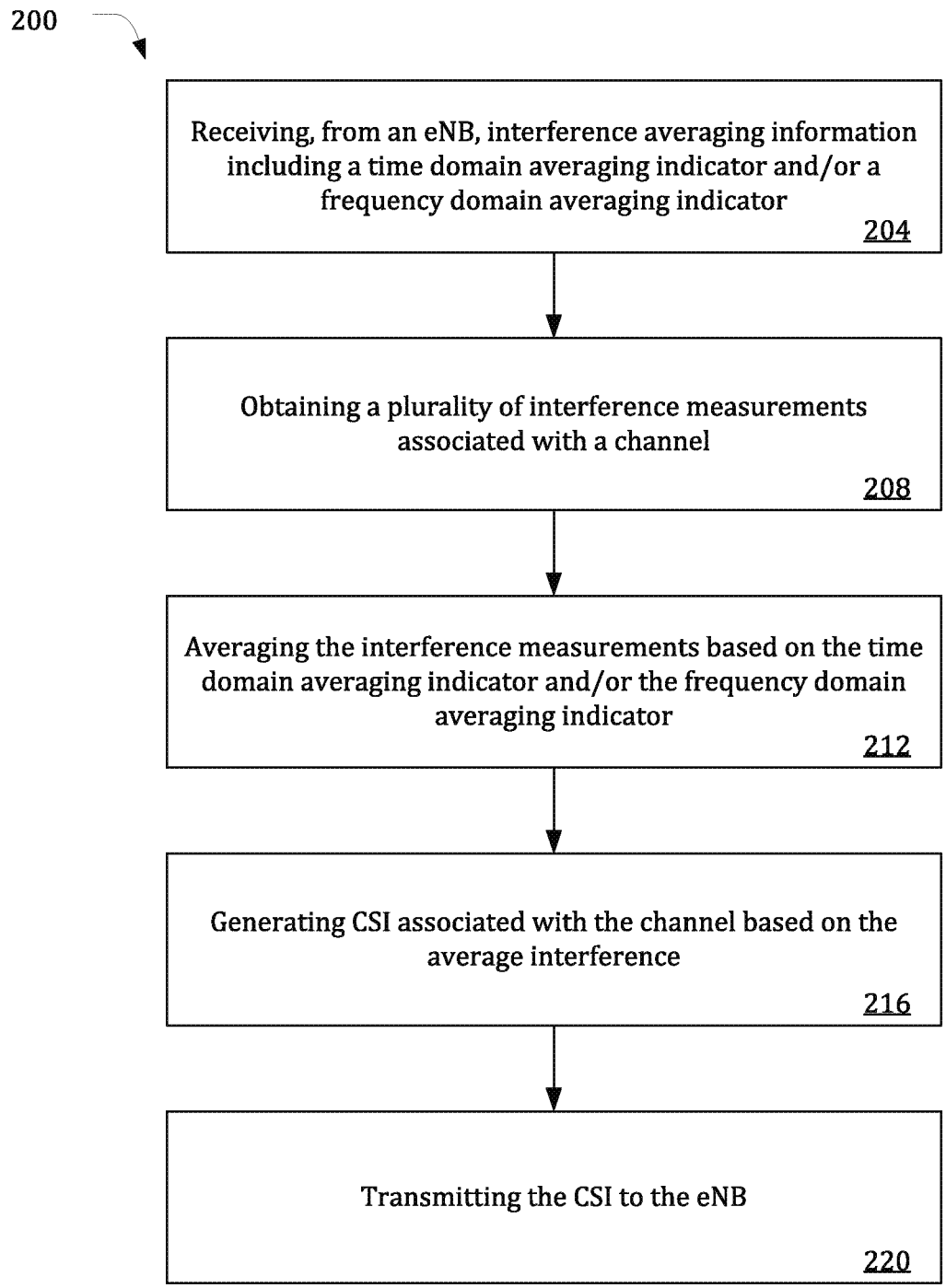
FIG. 2 illustrates a method for generating feedback information based on interference averaging information in accordance with various embodiments.

FIG. 2 illustrates a method 200 that may be performed by a UE (e.g., UE 104) in accordance with various embodiments. In some embodiments, the UE may include one or more tangible computer-readable media having instructions, stored thereon, that when executed cause the UE to perform method 200.

At 204, method 200 may include receiving, from an eNB (e.g., eNB 108), interference averaging information. The interference averaging information may include a time domain averaging indicator and/or a frequency domain averaging indicator, as described herein.

At 208, method 200 may include obtaining a plurality of interference measurements associated with a channel over which the UE communicates with the eNB.

At 212, method 200 may include averaging the interference measurements based on the time domain averaging indicator and/or frequency domain averaging indicator to obtain an average interference. For example, the interference measurements may be averaged in the time domain based on the time-domain averaging indicator and/or averaged in the frequency domain based on the frequency domain averaging indicator.

At 216, method 200 may include generating CSI associated with the channel based on the average interference.

At 220, method 200 may include transmitting the CSI to the eNB.

Figure 3:
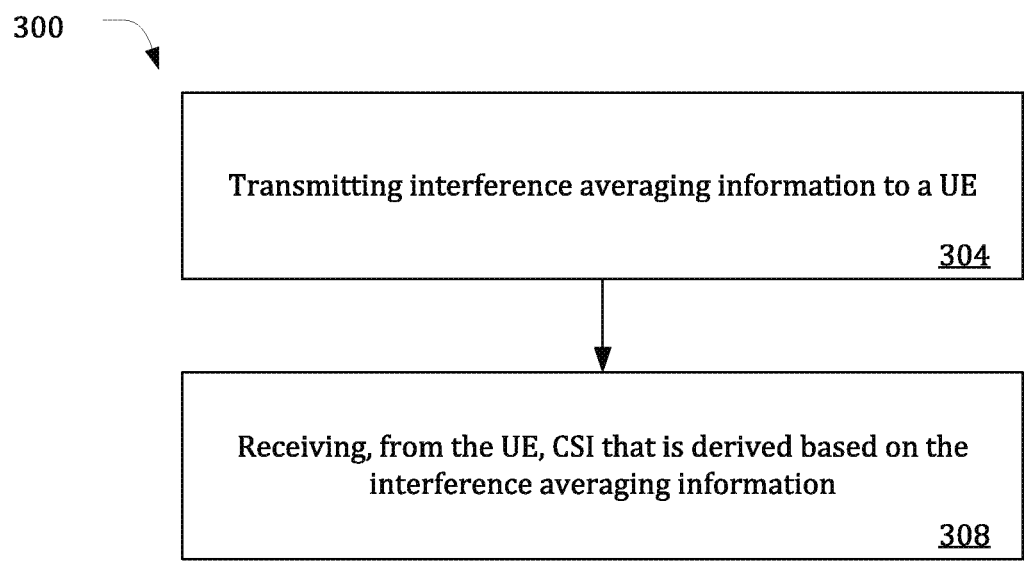
FIG. 3 illustrates a method for managing feedback information generated by a UE in accordance with various embodiments.

FIG. 3 illustrates a method 300 that may be performed by an eNB (e.g., eNB 108) in accordance with various embodiments. In some embodiments, the eNB may include one or more tangible computer-readable media having instructions, stored thereon, that when executed cause the eNB to perform method 300.

At 304, method 300 may include transmitting interference averaging information to a UE (e.g., UE 104). The interference averaging information may include a time domain averaging indicator and/or a frequency domain averaging indicator.

At 308, method 300 may include receiving, from the UE, CSI that is derived based on the interference averaging information. For example, the CSI may be derived based on an average interference that is averaged in the time domain based on the time domain averaging indicator and/or averaged in the frequency domain based on the frequency domain averaging indicator.

As discussed above, the interference measurement circuitry 124 of the UE 104 may measure interference on the channel for demodulation purposes in addition to or instead of measuring interference for generating feedback information. The transceiver circuitry 116 may receive signals from the eNB 108 over a plurality of resource elements of the channel, with the resource elements arranged in physical resource blocks (PRBs). The interference measurement circuitry 124 may measure interference on CRSs or UE-specific reference signals transmitted on the channel (e.g., within a PRB of the channel) by the eNB 108.

In various embodiments, the transceiver circuitry 116 may receive, from the eNB 108, an interference resource group (IRG) indicator to indicate a number of PRBs included in an IRG. The transceiver 140 of the eNB 108 may transmit the IRG indicator to the UE 104. In some embodiments, the IRG indicator may be transmitted by the eNB 108, and received by the UE 104, via RRC signaling.

The IRG may correspond to a set of one or more PRBs over which the UE 104 is to assume the same interference for demodulation purposes. Accordingly, the interference measurement circuitry 124 may average interference measurements over the IRG. For example, the interference measurement circuitry 124 may average the interference measurements taken on all CRSs and/or UE-specific reference signals in the IRG.

In some embodiments, the interference may include interfering signal parameters such as precoding, power, modulation, and/or transmission schemes. The average interference measurements performed by the interference measurement circuitry 124 may include estimating the interfering signal parameters and averaging the interfering signal parameters over the IRG.

The demodulation circuitry 132 may demodulate signals received from the eNB 108 on the IRG based on the averaged interference measurements provided by the interference measurement circuitry 124. For example, the demodulation circuitry 132 may be included in an "interference-aware" receiver of the UE 104, and the averaged interference measurements may facilitate demodulation of signals received on the IRG. In some embodiments, the interference measurements may be used to scale soft metrics (e.g., log likelihood ratios (LLRs)) associated with bits of the received signals so that received bits that are more affected by interference may provide less contribution to the decoding decision compared with received bits that are less affected by interference. Additionally, or alternatively, the demodulation circuitry 132 may be included in a multiple input multiple output (MIMO) receiver of the UE 104. For a MIMO receiver, the demodulation circuitry 132 may determine the receive beamforming based on the interference measurements. For example, the demodulation circuitry 132 may form nulls in an adaptive antenna pattern towards the interference direction(s). The adaptive antenna pattern may be used to demodulate the received signal.

In some embodiments, the interference measurement obtained by the interference measurement circuitry 124 for demodulation may include an interference covariance matrix, R. For example, the interference covariance matrix, R, may be estimated by the interference measurement circuitry 124 according to Equation (2) below:

$$\hat{R} = \frac{1}{N_p} \sum_{i=1}^{N_p} \{(y_i - \hat{H}_i p_i)(y_i - \hat{H}_i p_i)^H\} \quad (2)$$

where $y_i$ is a received signal vector on the resource elements occupied by the reference signals (e.g., CRSs or UE-specific reference signals), $\hat{H}_i$ is an estimated channel matrix for the resource elements of the reference signals, $p_i$ is the reference signal, and $N_p$ is the number of reference signals within the measuring region.

The estimated interference covariance matrix may include some errors, which may negatively impact the interference suppression of the demodulation circuitry 132. Use of the IRG as discussed herein may allow the UE 104 to average interference measurements over a plurality of PRBs when it is practical to do so. Accordingly, the accuracy and reliability of the interference measurements may be improved.

In some embodiments, the IRG may include a plurality of PRBs that are adjacent to one another in the time domain. The IRG indicator may include one or more bits to indicate a number of PRBs in the IRG.

In some embodiments, the IRG indicator may indicate that the number of PRBs in the IRG is equal to one PRB, one precoding resource group (PRG) including one or more PRBs, or one resource block group (RBG) including one or more PRBs. The PRG may correspond to a granularity of precoding assignments for signals sent to the UE 104 from the eNB 108. That is, the signals on all the PRBs of the PRG may include the same precoding. The RBG may correspond to a granularity of scheduling of channel resources for the UE 104. That is, transmissions to the UE 104 may be scheduled in RBGs.

For example, in some embodiments, the IRG indicator may include a first value to indicate that the IRG corresponds to one PRB, a second value to indicate that the IRG corresponds to one PRG, or a third value to indicate that the IRG corresponds to one RBG.

Alternatively, in some embodiments, the IRG indicator may include a single bit that has a first value to indicate that the IRG corresponds to a PRB or a second value to indicate that the IRG corresponds to a smaller one of a PRG or an RBG. If the interference measurement circuitry 124 determines that the IRG indicator has the second value, the interference measurement circuitry 124 may determine a number of PRBs in the PRG and a number of PRBs in the RBG based on a system bandwidth associated with the eNB 108. The number of PRBs in the PRG and/or RBG may vary according to the system bandwidth. For example, in some embodiments, the number of PRBs in the PRG and/or RBG may be as shown in Table 1:

TABLE 1

| System Bandwidth (number of PRBs) | PRG Size (PRBs) | RBG size (PRBs) |
|---|---|---|
| ≤10 | 1 | 1 |
| 11-26 | 2 | 2 |
| 27-63 | 3 | 3 |
| 64-110 | 2 | 4 |

Accordingly, the IRG indicator may be used to define the IRG size as the smaller of the precoding granularity or scheduling granularity.

In various embodiments, the eNB 108 may select the IRG size (and generate the IRG indicator) based on the precoding granularity, the scheduling granularity, and/or other factors. For example, when the precoding granularity and the scheduling granularity are a plurality of PRBs, the interference may not change significantly over the PRBs of an individual PRG or RBG. In these cases, use of the IRG by the UE 104 for determining interference for demodulation purposes may improve reliability and accuracy of interference measurements compared with using separate interference measurements for each PRB of the PRG or RBG.

In some embodiments, the eNB 108 may receive the IRG indicator and/or the granularity of one or more interfering parameters (e.g., precoding granularity or scheduling granularity) from another eNB (e.g., via a backhaul link such as an X2 interface). The eNB 108 may then transmit the IRG indicator to the UE 104.

Figure 4:
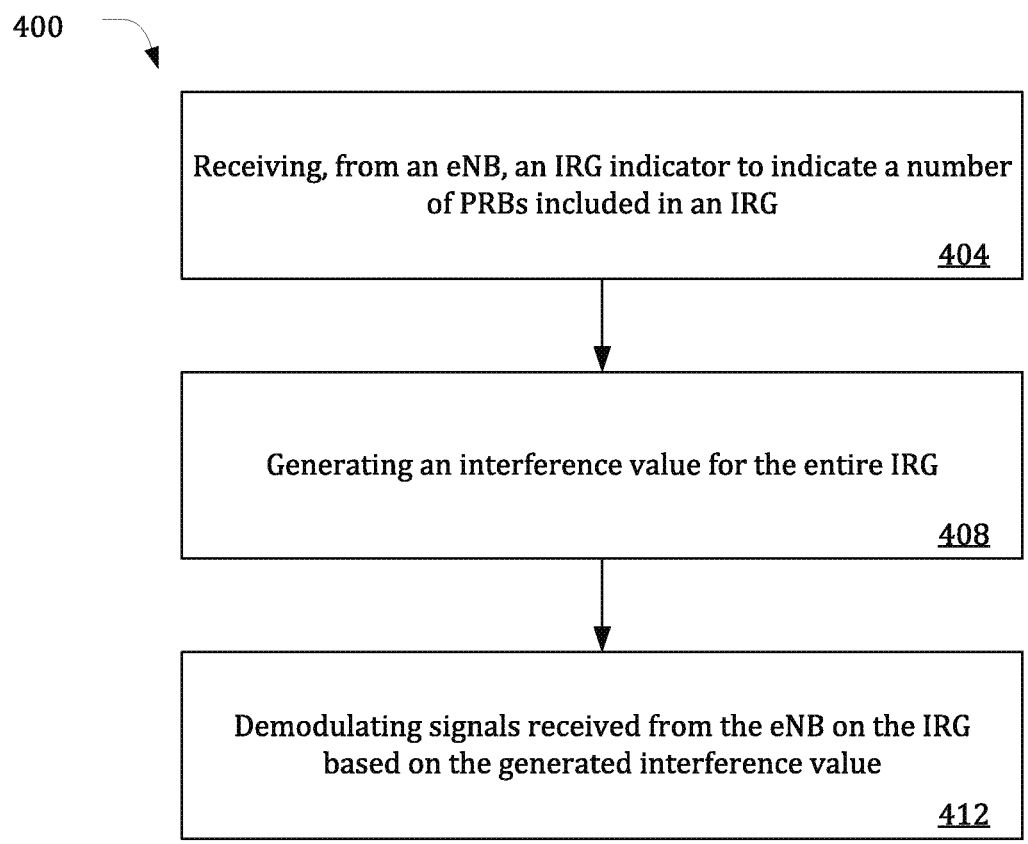
FIG. 4 illustrates a method for demodulating signals received from an eNB based on an interference resource group (IRG) in accordance with various embodiments.

FIG. 4 illustrates a method 400 that may be performed by a UE (e.g., UE 104) in accordance with various embodiments. In some embodiments, the UE may include one or more tangible computer-readable media having instructions, stored thereon, that when executed cause the UE to perform method 400.

At 404, method 400 may include receiving, from an eNB (e.g., eNB 108), an IRG indicator to indicate a number of PRBs included in an IRG.

At 408, method 400 may include generating an interference value for the entire IRG. The interference value for the entire IRG may be, for example, an average interference of interference measurements associated with the IRG.

At 412, method 400 may include demodulating signals received from the eNB on the IRG based on the generated interference value.

Figure 5:
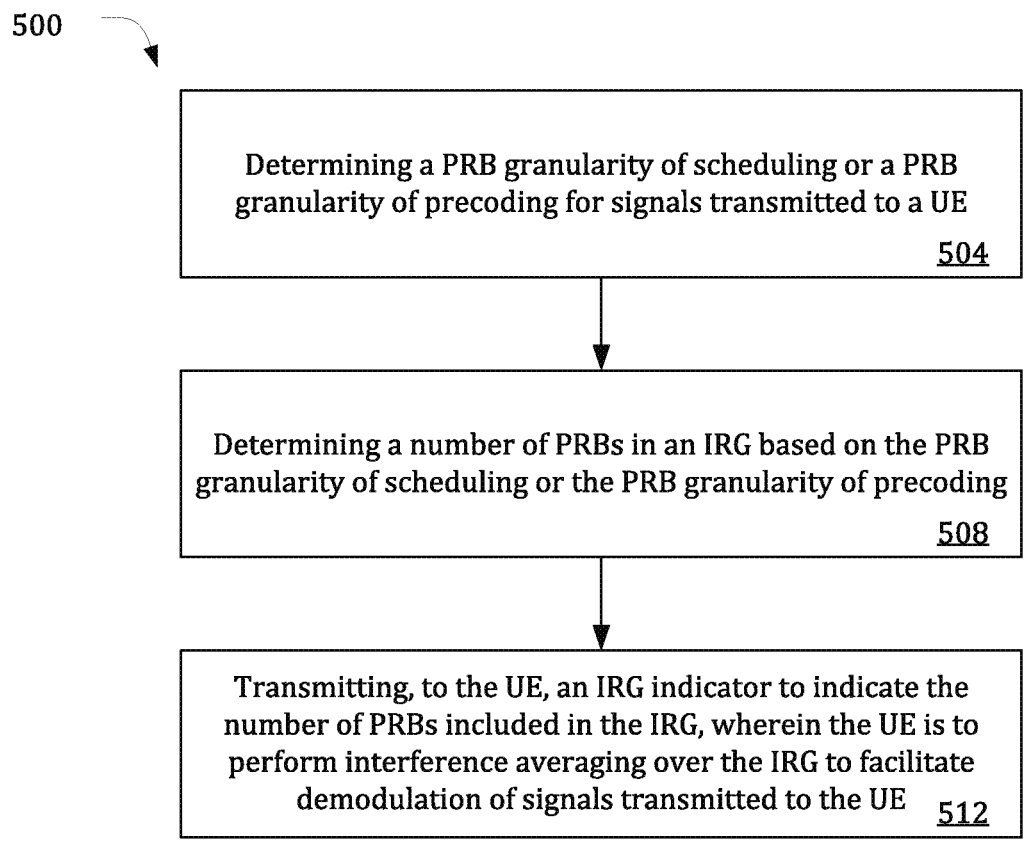
FIG. 5 illustrates a method for defining an IRG and notifying the UE of the IRG in accordance with various embodiments.

FIG. 5 illustrates a method 500 that may be performed by an eNB (e.g., eNB 108) in accordance with various embodiments. In some embodiments, the eNB may include one or more tangible computer-readable media having instructions, stored thereon, that when executed cause the eNB to perform method 500.

At 504, method 500 may include determining a PRB granularity of scheduling or PRB granularity of precoding for signals transmitted to a UE (e.g., UE 104) over a wireless communication network.

At 508, method 500 may include determining a number of PRBs in an IRG based on the PRB granularity of scheduling or the PRB granularity of precoding.

At 512, method 500 may include transmitting, to the UE, an IRG indicator to indicate the number of PRBs included in the IRG, wherein the UE is to perform interference averaging over the IRG to facilitate demodulation of the signals transmitted from the eNB to the UE.

Figure 6:
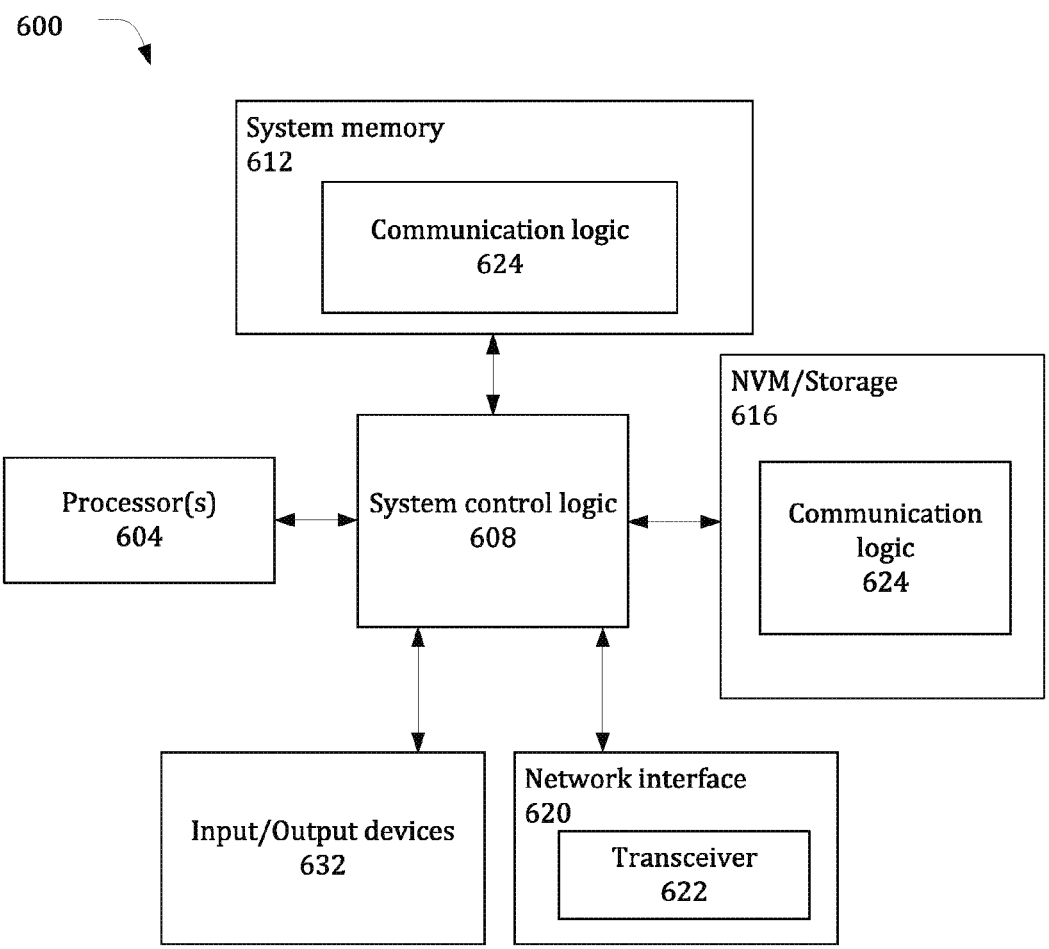
FIG. 6 schematically illustrates an example system that may be used to practice various embodiments described herein.

The UE 104 and eNB 108 described herein may be implemented into a system using any suitable hardware and/or software to configure as desired. FIG. 6 illustrates, for one embodiment, an example system 600 comprising one or more processor(s) 604, system control logic 608 coupled with at least one of the processor(s) 604, system memory 612 coupled with system control logic 608, non-volatile memory (NVM)/storage 616 coupled with system control logic 608, a network interface 620 coupled with system control logic 608, and input/output (I/O) devices 632 coupled with system control logic 608.

The processor(s) 604 may include one or more single-core or multi-core processors. The processor(s) 604 may include any combination of general-purpose processors and dedicated processors (e.g., graphics processors, application processors, baseband processors, etc.).

System control logic 608 for one embodiment may include any suitable interface controllers to provide for any suitable interface to at least one of the processor(s) 604 and/or to any suitable device or component in communication with system control logic 608.

System control logic 608 for one embodiment may include one or more memory controller(s) to provide an interface to system memory 612. System memory 612 may be used to load and store data and/or instructions, e.g., communication logic 624. System memory 612 for one embodiment may include any suitable volatile memory, such as suitable dynamic random access memory (DRAM), for example.

NVM/storage 616 may include one or more tangible, non-transitory computer-readable media used to store data and/or instructions, e.g., communication logic 624. NVM/storage 616 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 616 may include a storage resource physically part of a device on which the system 600 is installed or it may be accessible by, but not necessarily a part of, the device. For example, the NVM/storage 616 may be accessed over a network via the network interface 620 and/or over Input/Output (I/O) devices 632.

The communication logic 624 may include instructions that, when executed by one or more of the processors 604, cause the system 600 to perform operations associated with the components of the communication device 112 or 136 as described with respect to the above embodiments. In various embodiments, the communication logic 624 may include hardware, software, and/or firmware components that may or may not be explicitly shown in system 600.

Network interface 620 may have a transceiver 622 to provide a radio interface for system 600 to communicate over one or more network(s) and/or with any other suitable device. In various embodiments, the transceiver 622 may be integrated with other components of system 600. For example, the transceiver 622 may include a processor of the processor(s) 604, memory of the system memory 612, and NVM/Storage of NVM/Storage 616. Network interface 620 may include any suitable hardware and/or firmware. Network interface 620 may include a plurality of antennas to provide a multiple input, multiple output radio interface. Network interface 620 for one embodiment may include, for example, a wired network adapter, a wireless network adapter, a telephone modem, and/or a wireless modem.

For one embodiment, at least one of the processor(s) 604 may be packaged together with logic for one or more controller(s) of system control logic 608. For one embodiment, at least one of the processor(s) 604 may be packaged together with logic for one or more controllers of system control logic 608 to form a System in Package (SiP). For one embodiment, at least one of the processor(s) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip (SoC).

In various embodiments, the I/O devices 632 may include user interfaces designed to enable user interaction with the system 600, peripheral component interfaces designed to enable peripheral component interaction with the system 600, and/or sensors designed to determine environmental conditions and/or location information related to the system 600.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, an Ethernet connection, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 620 to communicate with components of a positioning network, e.g., a global positioning system (GPS) satellite.

In various embodiments, the system 600 may be a mobile computing device such as, but not limited to, a laptop computing device, a tablet computing device, a netbook, a smartphone, etc. In various embodiments, system 600 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

Some non-limiting examples are provided below.

Example 1 includes an apparatus to be employed by a user equipment (UE) to generate feedback information, the apparatus comprising transceiver circuitry to: communicate with an evolved Node B (eNB) over a channel of a wireless communication network; and receive, from the eNB, interference averaging information, the interference averaging information including a time domain averaging indicator indicating a time domain averaging window to be used by the UE for averaging interference measurements in a time domain or a frequency domain averaging indicator to indicate a frequency domain averaging window to be used by the UE for averaging interference measurements in a frequency domain. The apparatus of Example 1 further comprises interference measurement circuitry coupled to the transceiver circuitry, the interference measurement circuitry to: obtain a plurality of interference measurements associated with the channel; and average the interference measurements based on the interference averaging information. The apparatus of Example 1 further comprises feedback circuitry coupled to the interference measurement circuitry, the feedback circuitry to generate channel state information (CSI) associated with the channel based on the averaged interference; wherein the transceiver circuitry is further to transmit the CSI to the eNB.

Example 2 includes the apparatus of Example 1, wherein the interference averaging information includes the time domain averaging indicator and the frequency domain averaging indicator.

Example 3 includes the apparatus of Example 1, wherein the frequency domain averaging indicator includes a single bit that is to have a first value to indicate that the frequency domain averaging window includes a single sub-band of the channel or a second value to indicate that the frequency domain averaging window includes all sub-bands of the channel.

Example 4 includes the apparatus of Example 1, wherein the transceiver circuitry is to receive the interference averaging information via radio resource control (RRC) signaling.

Example 5 includes the apparatus of Example 1, wherein the interference averaging information includes the time domain averaging indicator, and wherein the time domain averaging indicator includes a single bit having a first value to indicate that the time domain averaging window is restricted to a single subframe, or a second value to indicate that the time domain averaging window is unrestricted in the frequency domain.

Example 6 includes the apparatus of Example 1, wherein the interference averaging information includes the time domain averaging indicator, wherein the UE is to receive a CSI feedback model associated with the channel, and wherein the feedback circuitry is to generate CSI for individual sub-bands of the channel based on a determination that the CSI feedback model supports sub-band channel quality indicators (CQIs).

Example 7 includes the apparatus of any one of Examples 1 to 6, wherein the interference measurement circuitry is to measure interference on one or more CSI-interference measurement (CSI-IM) resource elements (REs) of the channel to obtain the plurality of interference measurements.

Example 8 includes the apparatus of any one of Examples 1 to 6, wherein the interference measurements include channel quality indicator (CQI) measurements.

Example 9 includes an apparatus to be employed by an evolved Node B (eNB) to manage feedback information generated by a user equipment (UE), the apparatus comprising: transceiver circuitry to communicate with the UE over a channel of a wireless communication network; and interference management circuitry coupled to the transceiver circuitry, the interference management circuitry to transmit, via the transceiver circuitry, interference averaging information to indicate a time domain averaging window or a frequency domain averaging window over which the UE is to perform interference averaging to obtain an average interference used to generate channel state information (CSI) associated with the channel.

Example 10 includes the apparatus of Example 9, wherein the transceiver circuitry is further to receive the CSI associated with the channel from the UE.

Example 11 includes the apparatus of Example 9, wherein the interference averaging information includes a frequency domain averaging indicator having a single bit having a first value to indicate that the UE is to generate CSI for individual sub-bands of the channel or a second value to indicate that the UE is to generate CSI for the channel based on the average interference across all sub-bands of the channel.

Example 12 includes the apparatus of any one of Examples 9 to 11, wherein the interference averaging information indicates the time domain averaging window and the frequency domain averaging window.

Example 13 includes an apparatus to be employed by a user equipment (UE) to receive signals from an evolved Node B (eNB), the apparatus comprising transceiver circuitry to: communicate with the eNB over a plurality of resource elements arranged in physical resource blocks (PRBs) of a wireless communication channel; and receive, from the eNB, an interference resource group (IRG) indicator to indicate a number of the physical resource blocks (PRBs) included in an IRG. The apparatus of Example 13 further comprises: interference measurement circuitry to average interference measurements over the IRG to obtain one or more averaged interference parameters; and demodulation circuitry to demodulate signals received from the eNB on the IRG based on the averaged interference parameters.

Example 14 includes the apparatus of Example 13, wherein the IRG indicator is to indicate that the number of PRBs in the IRG is equal to one PRB, one precoding resource group (PRG) including one or more PRBs, or one resource block group (RBG) including one or more PRBs.

Example 15 includes the apparatus of Example 13, wherein the number of PRBs in the IRG corresponds to a granularity of scheduling of channel resources for the UE.

Example 16 includes the apparatus of Example 13, wherein the signals received from the eNB on the IRG include a same precoding, power, modulation, or transmission scheme.

Example 17 includes the apparatus of Example 13, wherein the IRG indicator includes a single bit that has a first value to indicate that the IRG corresponds to a single PRB or a second value to indicate that the IRG corresponds to a smaller one of a precoding resource group (PRB) or a resource block group (RBG).

Example 18 includes the apparatus of Example 17, wherein the interference measurement circuitry is to: determine that the IRG indicator indicates that the IRG corresponds to the smaller one of the PRG or the RBG; and determine a number of PRBs in the PRG and a number of PRBs in the RBG based on a system bandwidth associated with the eNB.

Example 19 includes the apparatus of any one of Examples 13 to 18, wherein the interference measurement circuitry is to perform the interference measurements on cell-specific reference signals (CRSs) or UE-specific reference signals received from the eNB.

Example 20 includes the apparatus of any one of Examples 13 to 18, wherein the PRBs in the IRG are adjacent to one another in the time domain.

Example 21 includes one or more tangible computer-readable media having instructions, stored thereon, that when executed cause an evolved Node B (eNB) to: determine a physical resource block (PRB) granularity of scheduling or a PRB granularity of precoding for signals transmitted from the eNB to a user equipment (UE) over a wireless communication network; determine a number of PRBs in an interference resource group based on the PRB granularity of scheduling or the PRB granularity of precoding; and transmit, to the UE, an IRG indicator to indicate the number of PRBs included in the IRG, wherein the UE is to perform interference averaging over the IRG to facilitate demodulation of the signals transmitted from the eNB to the UE.

Example 22 includes the one or more media of Example 21, wherein the instructions, when executed, cause the eNB to determine the PRB granularity of scheduling and the PRB granularity of precoding, wherein the number of PRBs in the IRG corresponds to a smaller one of the PRB granularity of scheduling or the PRB granularity of precoding.

Example 23 includes the one or more media of Example 21, wherein the IRG indicator is to indicate that the number of PRBs in the IRG is equal to one PRB, one precoding resource group (PRG) including one or more PRBs, or one resource block group (RBG) including one or more PRBs.

Example 24 includes the one or more media of Example 21, wherein the IRG indicator includes a single bit that has a first value to indicate that the UE is to perform interference averaging over a smaller one of a precoding resource group (PRB) or a resource block group (RBG), or a second value to indicate that the UE is to perform interference averaging over a single PRB.

Example 25 includes the one or more media of any one of Examples 21 to 24, wherein the IRG indicator is transmitted to the UE via radio resource control (RRC) signaling.

Example 26 includes an apparatus to be employed by an evolved Node B (eNB), the apparatus comprising: means for determining a physical resource block (PRB) granularity of scheduling or a PRB granularity of precoding for signals transmitted from the eNB to a user equipment (UE) over a wireless communication network; means for determining a number of PRBs in an interference resource group (IRG) based on the PRB granularity of scheduling or the PRB granularity of precoding; and means for transmitting, to the UE, an IRG indicator to indicate the number of PRBs included in the IRG, wherein the UE is to perform interference averaging over the IRG to facilitate demodulation of the signals transmitted from the eNB to the UE.

Example 27 includes the apparatus of claim 1, wherein the means for determining the number of PRBs in the IRG include means for determining the PRB granularity of scheduling and the PRB granularity of precoding, wherein the number of PRBs in the IRG corresponds to a smaller one of the PRB granularity of scheduling or the PRB granularity of precoding.

Example 28 includes the apparatus of claim 1, wherein the IRG indicator is to indicate that the number of PRBs in the IRG is equal to one PRB, one precoding resource group (PRG) including one or more PRBs, or one resource block group (RBG) including one or more PRBs.

Example 29 includes the apparatus of claim 1, wherein the IRG indicator includes a single bit that has a first value to indicate that the UE is to perform interference averaging over a smaller one of a precoding resource group (PRB) or a resource block group (RBG), or a second value to indicate that the UE is to perform interference averaging over a single PRB.

Example 30 includes the apparatus of any one of claims 1 to 29, wherein the means for transmitting is to transmit the IRG indicator to the UE via radio resource control (RRC) signaling.

What is claimed is:

1. An apparatus to be employed by a user equipment (UE) to generate feedback information, the apparatus comprising:
   transceiver circuitry to:
      communicate with an evolved Node B (eNB) over a channel of a wireless communication network; and
      receive, from the eNB, interference averaging information, the interference averaging information including a time domain averaging indicator indicating a time domain averaging window to be used by the UE for averaging interference measurements in a time domain or a frequency domain averaging indicator to indicate a frequency domain averaging window to be used by the UE for averaging interference measurements in a frequency domain; and
   interference measurement circuitry coupled to the transceiver circuitry, the interference measurement circuitry to:
      obtain a plurality of interference measurements associated with the channel; and
      average the interference measurements based on the interference averaging information; and
   feedback circuitry coupled to the interference measurement circuitry, the feedback circuitry to generate channel state information (CSI) associated with the channel based on the averaged interference;
   wherein the transceiver circuitry is further to transmit the CSI to the eNB.

2. The apparatus of claim 1, wherein the interference averaging information includes the time domain averaging indicator and the frequency domain averaging indicator.

3. The apparatus of claim 1, wherein the interference averaging information includes the frequency domain averaging indicator, and wherein the frequency domain averaging indicator includes a single bit that is to have a first value to indicate that the frequency domain averaging window includes a single sub-band of the channel or a second value to indicate that the frequency domain averaging window includes all sub-bands of the channel.

4. The apparatus of claim 1, wherein the transceiver circuitry is to receive the interference averaging information via radio resource control (RRC) signaling.

5. The apparatus of claim 1, wherein the interference averaging information includes the time domain averaging indicator, and wherein the time domain averaging indicator includes a single bit having a first value to indicate that the time domain averaging window is restricted to a single subframe, or a second value to indicate that the time domain averaging window is unrestricted in the time domain.

6. The apparatus of claim 1, wherein the interference averaging information includes the time domain averaging indicator, wherein the UE is to receive a CSI feedback model associated with the channel, and wherein the feedback circuitry is to generate CSI for individual sub-bands of the channel based on a determination that the CSI feedback model supports sub-band channel quality indicators (CQIs).

7. The apparatus of claim 1, wherein the interference measurement circuitry is to measure interference on one or more CSI-interference measurement (CSI-IM) resource elements (REs) of the channel to obtain the plurality of interference measurements.

8. The apparatus of claim 1, wherein the interference measurements include channel quality indicator (CQI) measurements.

9. An apparatus to be employed by an evolved Node B (eNB) to manage feedback information generated by a user equipment (UE), the apparatus comprising:
transceiver circuitry to communicate with the UE over a channel of a wireless communication network; and
interference management circuitry coupled to the transceiver circuitry, the interference management circuitry to transmit, to the UE via the transceiver circuitry, interference averaging information to indicate a frequency domain averaging window over which the UE is to perform interference averaging to obtain an average interference used to generate channel state information (CSI) associated with the channel.

10. The apparatus of claim 9, wherein the transceiver circuitry is further to receive the CSI associated with the channel from the UE.

11. The apparatus of claim 9, wherein the interference averaging information includes a frequency domain averaging indicator having a single bit having a first value to indicate that the UE is to generate CSI for individual sub-bands of the channel or a second value to indicate that the UE is to generate CSI for the channel based on the average interference across all sub-bands of the channel.

12. The apparatus of claim 9, wherein the interference averaging information is further to indicate a time domain averaging window.

13. An apparatus to be employed by a user equipment (UE) to receive signals from an evolved Node B (eNB), the apparatus comprising:
transceiver circuitry to:
communicate with the eNB over a plurality of resource elements arranged in physical resource blocks (PRBs) of a wireless communication channel; and
receive, from the eNB, an interference resource group (IRG) indicator to indicate a number of the physical resource blocks (PRBs) included in an IRG;
interference measurement circuitry to average interference measurements over the IRG to obtain one or more averaged interference parameters; and
demodulation circuitry to demodulate signals received from the eNB on the IRG based on the averaged interference parameters.

14. The apparatus of claim 13, wherein the IRG indicator is to indicate that the number of PRBs in the IRG is equal to one PRB, one precoding resource group (PRG) including one or more PRBs, or one resource block group (RBG) including one or more PRBs.

15. The apparatus of claim 13, wherein the number of PRBs in the IRG corresponds to a granularity of scheduling of channel resources for the UE.

16. The apparatus of claim 13, wherein the signals received from the eNB on the IRG include a same precoding, power, modulation, or transmission scheme.

17. The apparatus of claim 13, wherein the IRG indicator includes a single bit that has a first value to indicate that the IRG corresponds to a single PRB or a second value to indicate that the IRG corresponds to a smaller one of a precoding resource group (PRB) or a resource block group (RBG).

18. The apparatus of claim 17, wherein the interference measurement circuitry is to:
determine that the IRG indicator indicates that the IRG corresponds to the smaller one of the PRG or the RBG; and
determine a number of PRBs in the PRG and a number of PRBs in the RBG based on a system bandwidth associated with the eNB.

19. The apparatus of claim 13, wherein the interference measurement circuitry is to perform the interference measurements on cell-specific reference signals (CRSs) or UE-specific reference signals received from the eNB.

20. The apparatus of claim 13, wherein the PRBs in the IRG are adjacent to one another in the time domain.

21. One or more non-transitory computer-readable media having instructions, stored thereon, that when executed cause an evolved Node B (eNB) to:
determine a physical resource block (PRB) granularity of scheduling or a PRB granularity of precoding for signals transmitted from the eNB to a user equipment (UE) over a wireless communication network;
determine a number of PRBs in an interference resource group (IRG) based on the PRB granularity of scheduling or the PRB granularity of precoding; and
transmit, to the UE, an IRG indicator to indicate the number of PRBs included in the IRG, wherein the UE is to perform interference averaging over the IRG to facilitate demodulation of the signals transmitted from the eNB to the UE.

22. The one or more non-transitory computer-readable media of claim 21, wherein the instructions, when executed, cause the eNB to determine the PRB granularity of scheduling and the PRB granularity of precoding, wherein the number of PRBs in the IRG corresponds to a smaller one of the PRB granularity of scheduling or the PRB granularity of precoding.

23. The one or more non-transitory computer-readable media of claim 21, wherein the IRG indicator is to indicate that the number of PRBs in the IRG is equal to one PRB, one precoding resource group (PRG) including one or more PRBs, or one resource block group (RBG) including one or more PRBs.

24. The one or more non-transitory computer-readable media of claim 21, wherein the IRG indicator includes a single bit that has a first value to indicate that the UE is to perform interference averaging over a smaller one of a precoding resource group (PRB) or a resource block group (RBG), or a second value to indicate that the UE is to perform interference averaging over a single PRB.

25. The one or more non-transitory computer-readable media of claim 21, wherein the IRG indicator is transmitted to the UE via radio resource control (RRC) signaling.

\* \* \* \* \*